(No Model.) 7 Sheets—Sheet 1.
T. I. SHUTTLEWORTH & C. H. & J. BURT.
LOOM FOR WEAVING DOUBLE PILE FABRICS.
No. 470,452. Patented Mar. 8, 1892.
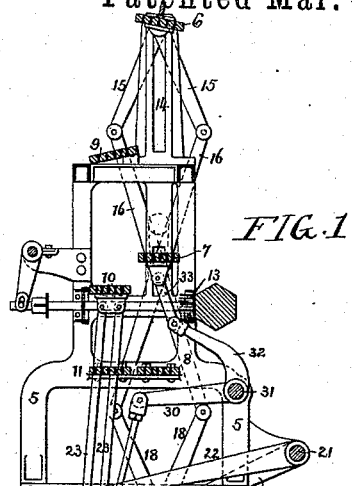
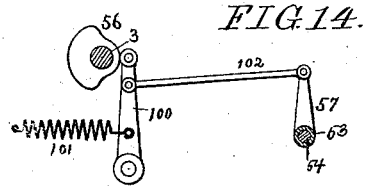
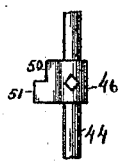
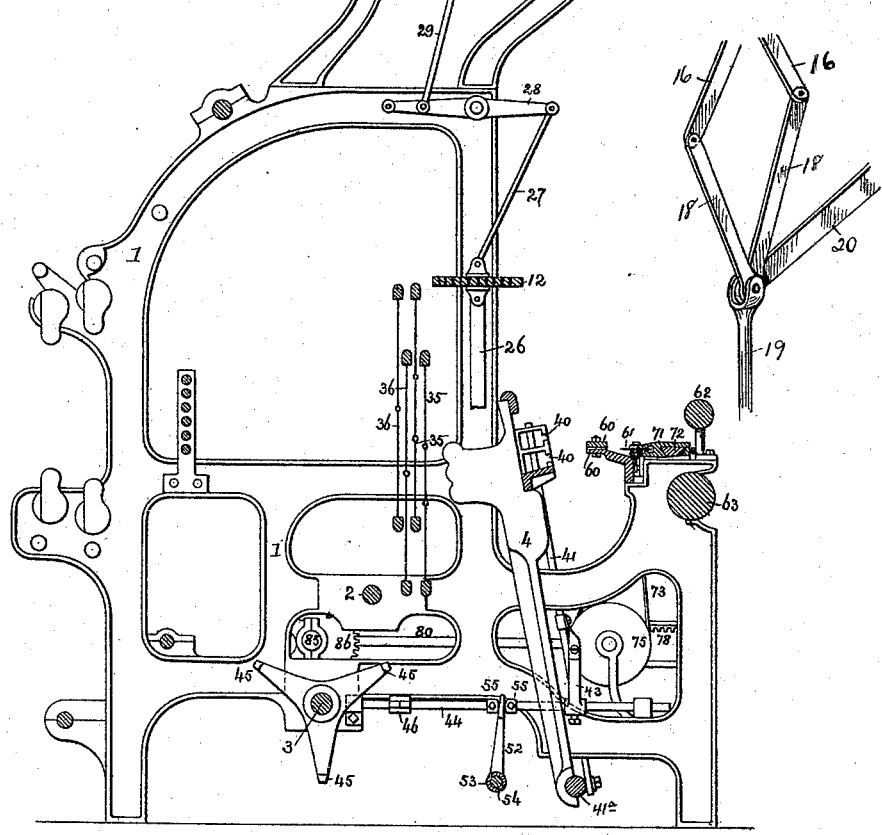
Witnesses:
Murray C. Boyer.
A. V. Groupe.
Inventors:
Tom I. Shuttleworth,
Charles H. Burt, and John Burt
by their Attorneys.
Howson & Howson

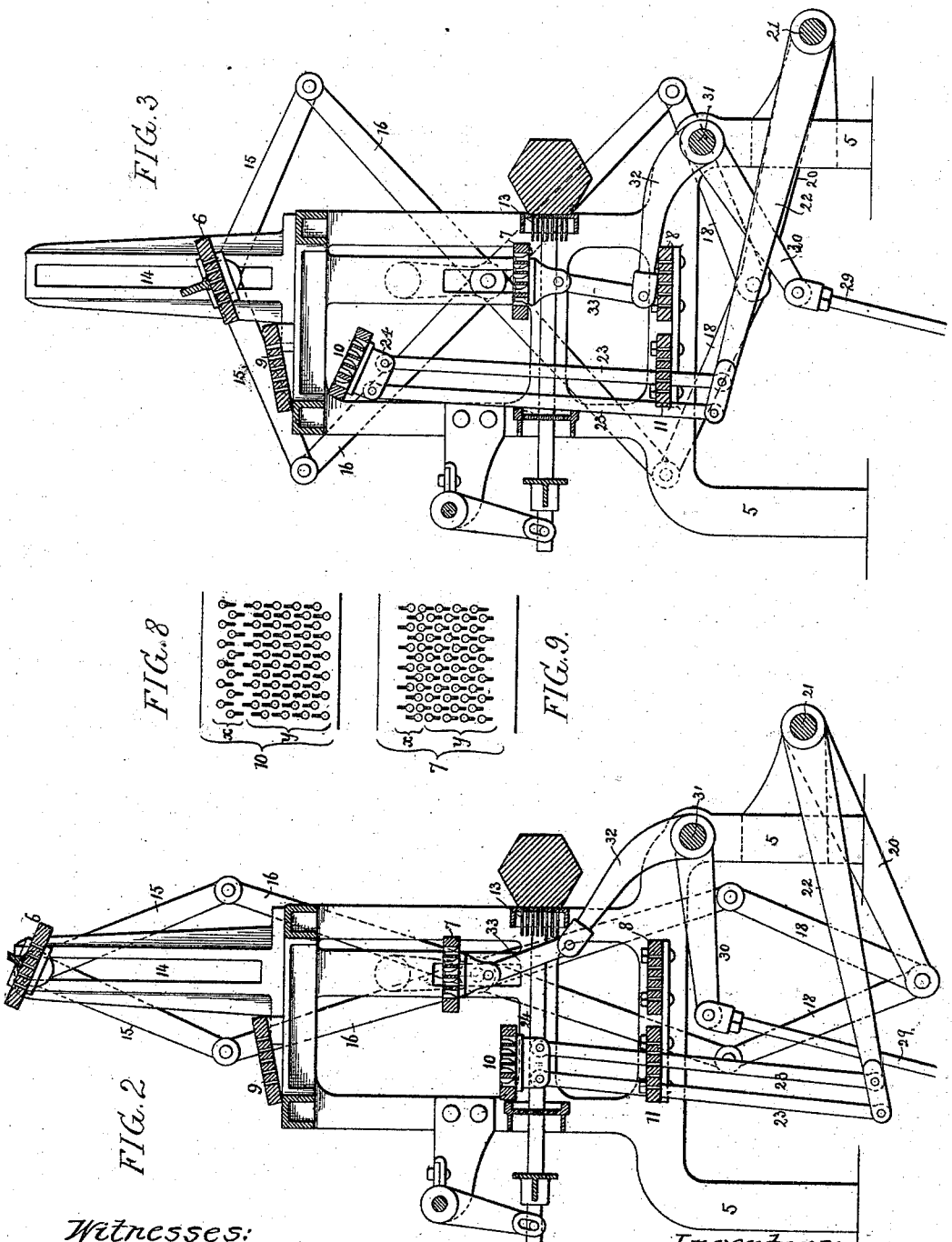

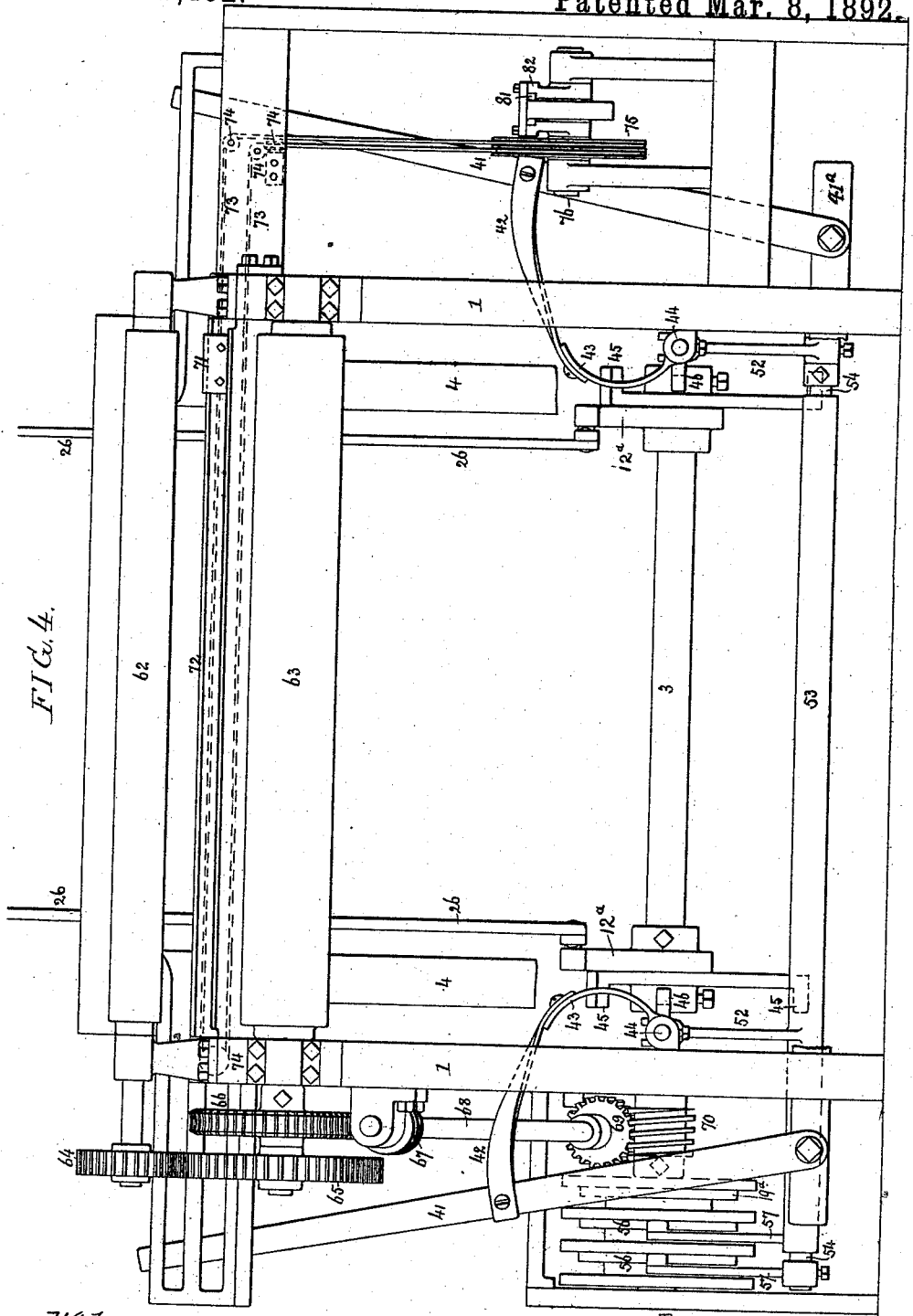

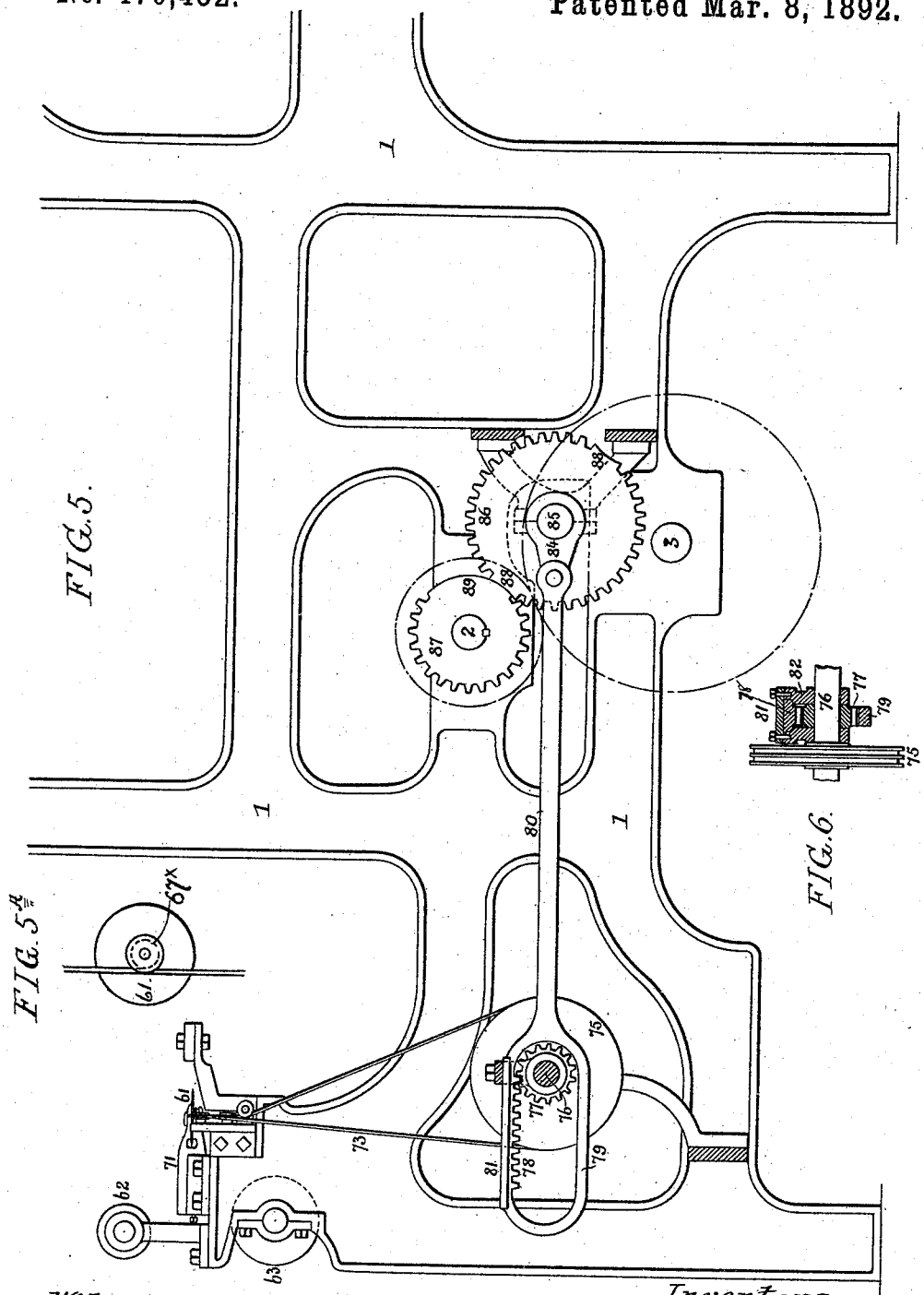

(No Model.) 7 Sheets—Sheet 5.
T. I. SHUTTLEWORTH & C. H. & J. BURT.
LOOM FOR WEAVING DOUBLE PILE FABRICS.
No. 470,452. Patented Mar. 8, 1892.
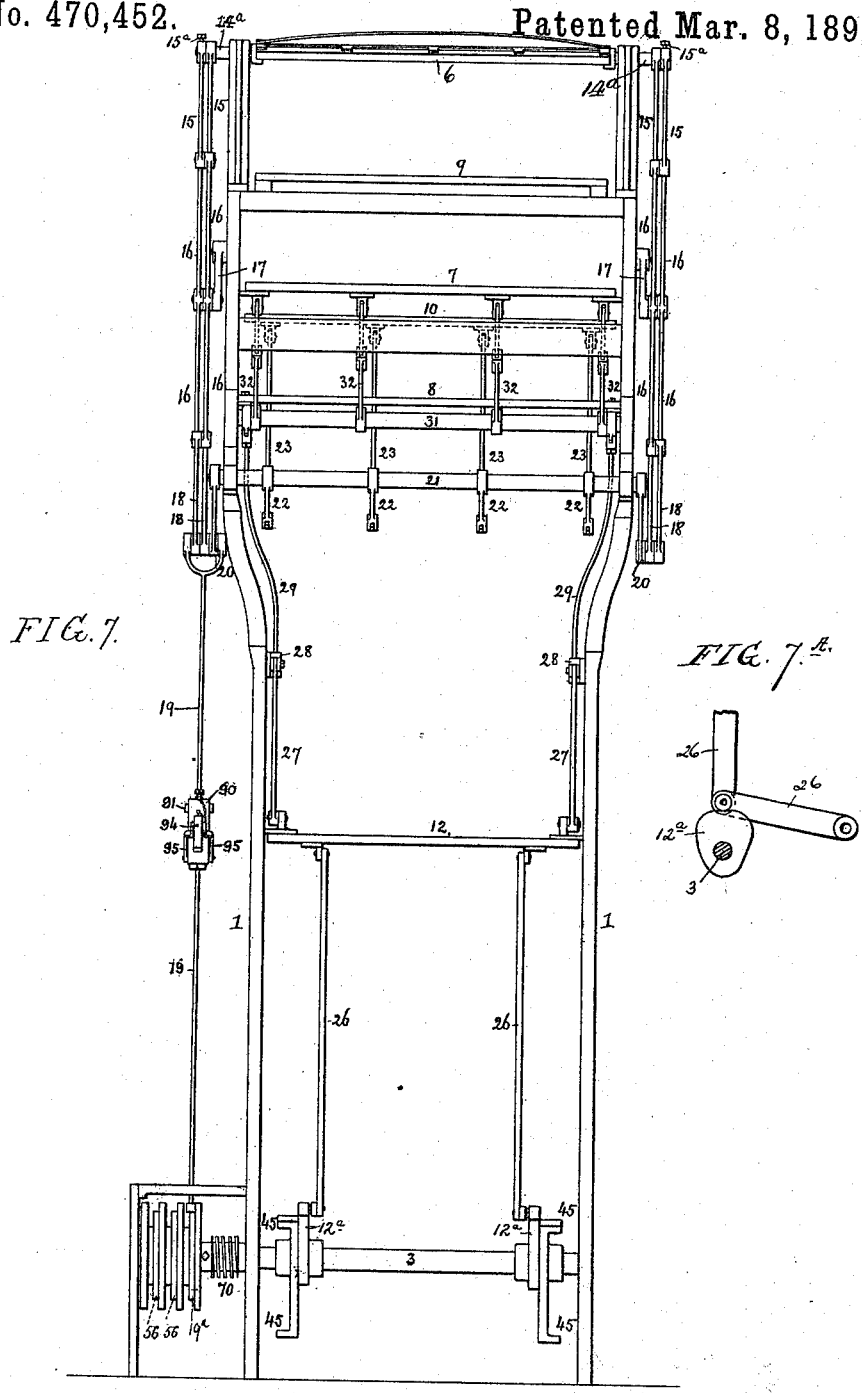
FIG. 7.  FIG. 7ª.
Witnesses:
Murray C. Boyer.
A. V. Groupe
Inventors:
Tom I. Shuttleworth.
Charles H. Burt and John Burt
by their Attorneys.
Howson & Howson (No Model.) 7 Sheets—Sheet 6.
T. I. SHUTTLEWORTH & C. H. & J. BURT.
LOOM FOR WEAVING DOUBLE PILE FABRICS.
No. 470,452. Patented Mar. 8, 1892.
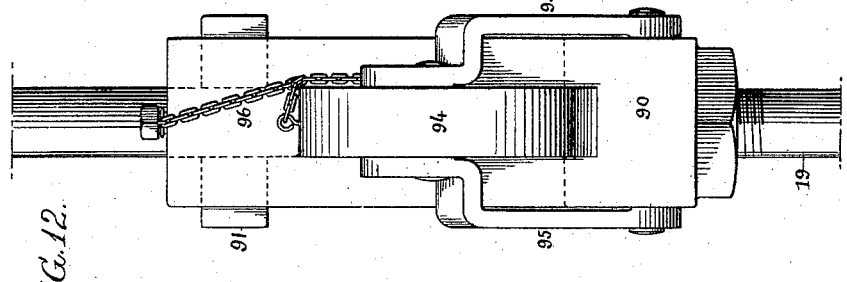
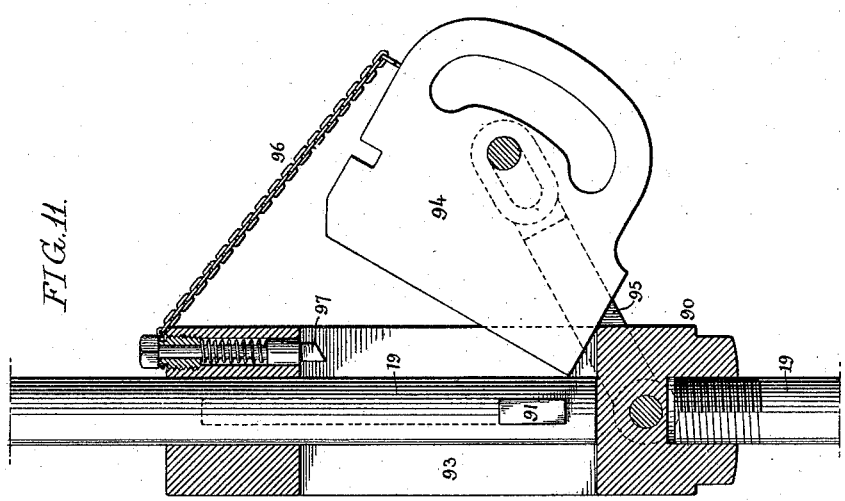
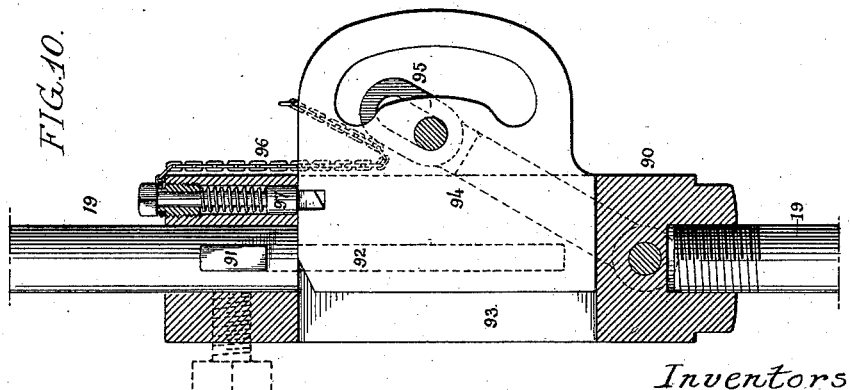
Witnesses:
Murray C. Boyer.
A. V. Groupe
Inventors:
Tom I. Shuttleworth
Charles H. Burt and
John Burt
by their Attorneys.
Howson & Howson

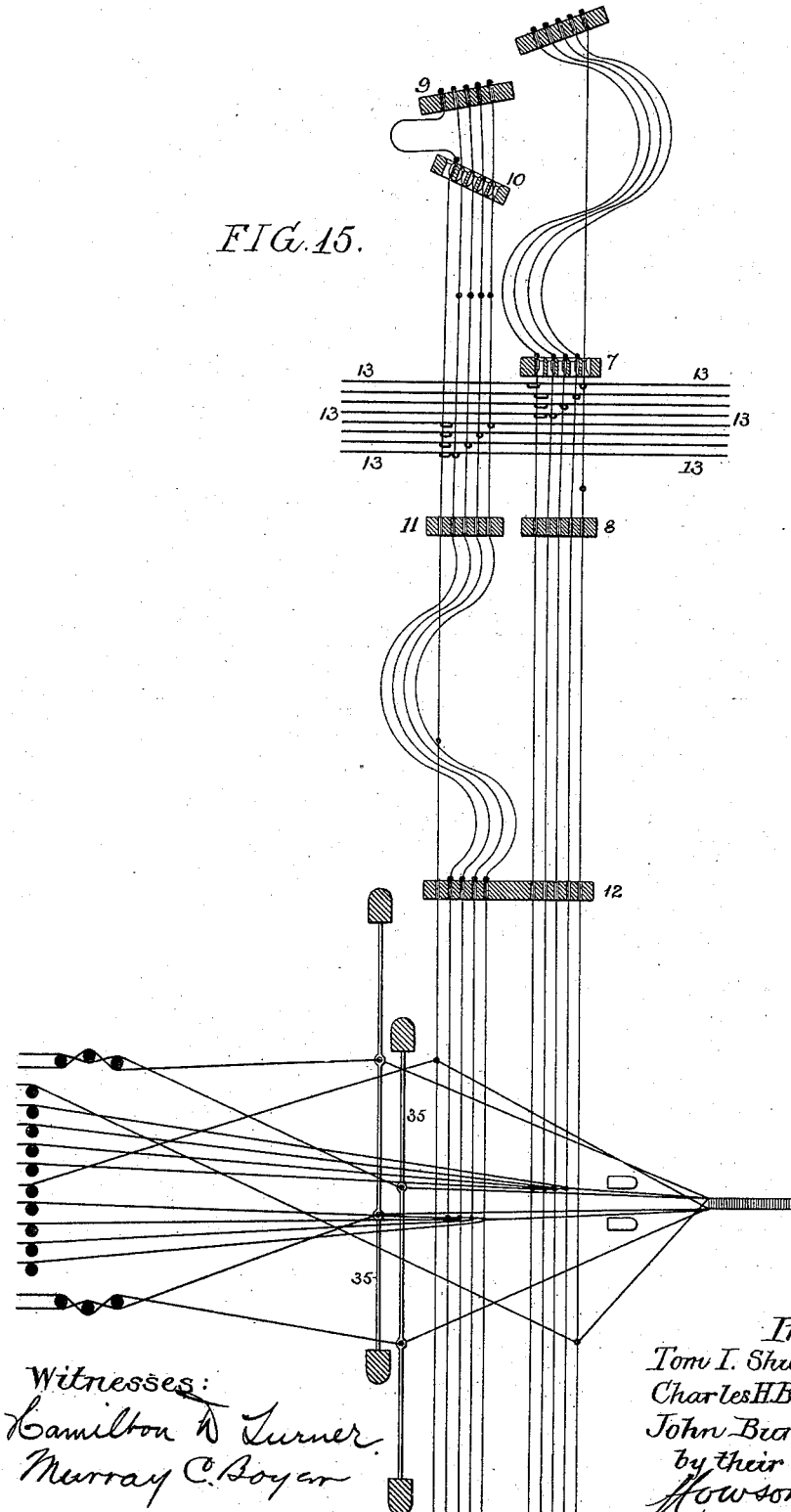

UNITED STATES PATENT OFFICE.

TOM I. SHUTTLEWORTH AND CHARLES H. BURT, OF WARREN, MASSACHU-
SETTS, AND JOHN BURT, OF PHILADELPHIA, PENNSYLVANIA.

LOOM FOR WEAVING DOUBLE PILE FABRICS.

SPECIFICATION forming part of Letters Patent No. 470,452, dated March 8, 1892.

Application filed July 21, 1890. Serial No. 359,433. (No model.)

*To all whom it may concern:*

Be it known that we, TOM I. SHUTTLEWORTH and CHARLES H. BURT, of Warren, Worcester county, Massachusetts, and JOHN BURT, of Philadelphia, Pennsylvania, all citizens of the United States, have invented certain Improvements in Looms for Weaving Double Pile Fabrics, of which the following is a specification.

Our invention relates to that class of looms in which two webs are simultaneously woven, these webs being connected by figuring warp-threads carried across from one web to the other and afterward severed, so as to produce a cut pile on each web, one of the objects of our invention being to improve the Jacquard mechanism for a loom of this class, another object being to provide for the proper operation of the shuttles in the upper and lower boxes of the lathe by imparting such an impulse to each shuttle as will insure its passage across the lathe, a further object being to provide simple and effective means for the cutting apart of the double fabric after the same has been woven, and a still further object being to permit of the weaving of "tabs" or pieces of plain web at the ends of each length of pile fabric produced. These objects we attain in the manner hereinafter set forth, reference being had to the accompanying drawings, in which—

Figure 1 is a view, partly in section and partly in elevation, of sufficient of a double-pile-fabric loom to illustrate our invention. Figs. 2 and 3 are enlarged sectional views of the Jacquard mechanism of the loom, showing the parts in different positions. Fig. 4 is an enlarged front view of the loom, illustrating the take-up and picking devices. Fig. 5 is a side view of the loom, illustrating the mechanism for operating the cutter. Fig. 6 is a transverse section of part of said cutting mechanism. Fig. 7 is a front view, on a reduced scale, of the Jacquard mechanism of the loom. Figs. 8 and 9 are plan views of parts of the figure-lift boards of the Jacquard mechanism. Figs. 10, 11, and 12 are views of the device whereby the production of tabs or plain webs on the pile fabric is permitted. Figs. 13 and 14 are detached views of some of the details of the picking mechanism, and Fig. 15 is a diagram illustrating the shedding of the warp-threads in the loom. Figs. $5^a$ and $7^a$ are detached views illustrating minor details of construction. Fig. $1^a$ is a detached view illustrating the connection between certain operative parts of the loom.

The frames 1 of the loom may be of any desired construction and are provided with bearings for the main driving or crank shaft 2 and cam-shaft 3, which are geared together, so as to rotate at the proper relative speed, the lathe 4 of the loom being vibrated by means of a connection with the crank-shaft in the usual manner.

On the main frame of the loom is mounted the Jacquard frame 5, this jacquard being duplex—that is to say, it controls two sets of harness, one set carrying the figuring warp-threads for the upper fabric and the other set carrying the figuring warp-threads for the lower fabric. The threads constituting the front harness control the figuring-warps of the top fabric and are hung from a board 6, to which a rising-and-falling movement is imparted by the mechanism described hereinafter, the threads passing through the openings in a lifter-board 7, and thence through openings in a fixed guide-board 8 on the frame of the jacquard and through openings in the comber-board 12. The threads of the rear harness, which control the figuring warp-threads of the lower fabric, are hung from a stationary board 9, pass through the openings in a board 10, thence through guide-openings in a board 11 on the fixed frame, and thence through openings in the board 12. The front harness-threads have knots formed thereon, these knots being immediately above the board 7 when the parts are in the position shown in Fig. 2. The rear harness-threads have two sets of knots, one set being located above the board 10 when the latter is in its lower position and the other set being above the board 12 when the latter is down.

The boards 7 and 10 are nicked—that is to say, each of the openings in each of these boards has a notch or recess of contracted width extending therefrom—the notches in the opposite boards facing in opposite directions, however, as shown in Figs. 8 and 9, and the notch of one opening $x$ in each set in each of the boards facing in the opposite direction from the notches of the other openings $y$, so that when a thread is pushed into a notch of the opening $x$ another thread connected with the same needle will be pushed out of the notch in the corresponding opening $y$, and vice versa.

All of the harness-threads are under control of the needles 13 of the jacquard, which needles occupy the position shown in Fig. 1, and the harness-threads of the front set normally occupy a position in the notches of the openings $y$ and in the openings $x$ of the board 7, while the harness-threads of the rear set occupy a position in the openings $y$ and in the notches of the openings $x$ of the board 10. There are four needles in each set, each of the needles controlling one of the first four threads and all of the needles controlling the fifth thread, as shown in Fig. 15, so that the operation of the five threads of each set is effected with the use of but four needles—that is to say, when either of the first four threads is pushed out of the notch of its opening in the board 7, so as to be free from the control of said board, the fifth thread is pushed into the notch of its opening $x$, so as to be brought under control of the board, the fifth thread being free from control only when all four of the other threads are permitted to remain in their notches, and reversely, in the board 10. When one of the first four threads is pushed into a notch, the fifth thread is pushed out of its notch, said fifth thread only remaining in its notch when none of the other threads are actuated. By this means the board 7 always controls four of its five harness-threads, and the board 10 controls one of its five threads.

The boards 7 and 12 only have a movement of limited extent sufficient to operate the harness-threads controlled thereby, so as to raise or lower the figuring warp-threads to the extent of the shed of the upper or lower fabric, respectively. Hence these boards may be termed "comber-boards." The boards 6 and 10, however, have a more extended movement. Hence a harness-thread which occupies a full opening in the board 7, and is thus freed from the control of the same, will be actuated by the board 6, and will carry its figuring warp-thread from the top of the upper shed to the bottom of the lower shed, or vice versa, so as to cause it to pass from one fabric to the other, and thus form a pile-thread, and in like manner the harness-thread controlled by the board 10 will carry its figuring-warp from the bottom of the lower shed to the top of the upper shed and back again. Hence these boards 6 and 10 may be termed "figure-boards."

The figure-board 6 is guided in its vertical movement by oppositely-slotted frames 14, and this board has trunnions $14^a$ at its opposite ends, a trunnion at each end of the board being, as shown in Fig. 7, secured to one of a pair of arms 15 by a set-screw $15^a$, the other arm turning loosely on the trunnion. The lower ends of the arms 15 are jointed to the upper ends of levers 16, which are hung to pendent arms 17 on the side frames 5 of the jacquard, (see Fig. 7,) the lower ends of the levers 16 being connected to the upper ends of arms 18, the lower ends of which are connected to arms 20 on a rock-shaft 21, one of said arms 20 being also connected to a rod 19, to which a vertical reciprocating motion is imparted from a suitable cam $19^a$ on the shaft 3 of the loom. (See Fig. 7.) This system of arms and levers forms a lazy-tongs structure, whereby the movement of the rod 19 is transmitted to the board 6, and owing to the fact that said board is secured at each end to one of the pair of arms 15 the board partakes of the swinging movement of said arm, and consequently changes its angle as it is moved vertically, the board inclining downwardly toward the front end when at the upward limit of its movement and inclining upwardly toward the front end when at the lower limit of movement, thus imparting to the figuring warp-threads under control of the harness-threads carried by said board 6 the proper angle required by the shed.

The rock-shaft 21 has arms 22, the inner ends of which are connected by rods 23 to brackets 24 on the under side of the figure-board 10. Hence movement is imparted simultaneously to the boards 6 and 10, the movement, however, being in a reverse direction, one board rising as the other falls.

By the use of the parallel rods 23 the figure-board 10 follows the angle of the vibrating arm 22, and thus properly changes the angle of the warp-threads controlled by its harness-threads to accord with the angle of the shed.

Owing to the connection of the lower ends of the arms 18 of the lazy-tongs structure to the ends of the arms 20 said arms 18 travel in the arcs of circles coincident with those of the connecting-pins at the ends of said arms 20, and as the upper ends of the arms 15 of the lazy-tongs structure are so guided as to be incapable of lateral movement the pivot-pins of the connecting-levers 16 must have a slight lateral play, hence the mounting of said pivot-pins upon the pendent swinging arms 17.

Owing to the fact that both of the figuring-boards are operated by the same rod and both control the same number of harness-threads, it follows that one board and its load counterbalances or serves as a counter-weight for the other board and its load—that is to say, the weight tending to pull down the descending board is the same or substantially the same as that tending to retard the movement of the rising board. Hence the parts are maintained in equilibrium and the operating devices are relieved in great measure from the strain to which they would otherwise be subjected. The same result is effected in the case of the comber-boards 7 and 12, a vertical reciprocating movement being imparted to the board 12 from suitable cams $12^a$ on the shaft 3 acting through the medium of levers 26ª and rods 26, Fig. 7ª, near each end of the board, and the board 7 being operated from the board 12, but in a reverse direction, through the medium of a system of rods and levers at each side of the loom, each system comprising a rod 27, lever 28, rod 29, arm 30, rock-shaft 31, arm 32, and connecting-rod 33, as shown in Fig. 1.

The loom has heddle-frames 35 and 36, each of the heddle-frames 35 being provided with double eyes for controlling the binding-warps of the upper and lower sheds, while each of the heddles 36 has a single eye, these heddles being intended for controlling stuffer-warps such as set forth in the Letters Patent No. 391,652, dated October 23, 1888. The means for effecting the reciprocation of these heddle-frames forms no part of our invention, and may be varied in many ways without departing from the invention. Hence it has not been deemed necessary to show or describe it.

The lathe 4 carries opposite pairs of shuttle-boxes 40, one above the other, the upper shuttle supplying the weft-thread for the upper fabric and the lower shuttle carrying the weft-thread for the lower fabric, and these shuttles are thrown across the race in opposite directions—that is to say, when the upper shuttle traverses from right to left the lower shuttle will traverse from left to right, and vice versa.

The picking of the shuttles is effected as usual by means of opposite picking-sticks 41, hung to the pivot-shaft 41ª of the lathe and each connected by a strap 42 to a curved arm 43 on a shaft 44, which is hung to suitable bearings on the frame of the loom, as shown in Figs. 1 and 4, and is free both to vibrate and to slide longitudinally in said bearings, the vibrating movement of the shaft being effected by the action of tappets or hammers 45 on the shaft 3, these tappets or hammers acting upon a block 46, secured to the shaft 44, as shown in Figs. 1 and 13. As each picking-stick, however, acts alternately upon a shuttle in an upper box and upon a shuttle in a lower box, it becomes desirable to vary the extent of movement imparted to the stick, in order that substantially uniform picking impulses may be imparted to the shuttles—that is to say, when the picking-stick is acting upon the shuttle in the lower box it should have a somewhat more extended movement than when acting upon the shuttle in the upper box, owing to the fact that the lower shuttle is closer to the fulcrum or axis of vibration of the picking-stick. We therefore use a differential block 46 for the action of the picking-hammers 45, this block having two portions 50 and 51, Fig. 13, the portion 51 projecting somewhat farther from the shaft than the portion 50, and the shaft 44 is moved longitudinally in its bearings, so as to cause the hammers 45 to act upon the portions 50 and 51 of the block alternately, the portion 50 being acted upon when the picking-stick is acting upon the shuttle in the upper box and the portion 51 being acted upon so as to cause a more extended movement of the picking-stick when the latter is acting upon the shuttle in the lower box.

The longitudinal movement of the shafts 44, so as to bring the long and short projections of the picking-block alternately under the action of the hammers 45, is effected by arms 52, one of which is carried by a sleeve 53, mounted in a suitable bearing in one side of the loom-frame, the other arm being carried by a shaft 54, which extends through the tubular shaft or sleeve 53, each arm 52 being forked at its upper end and fitting between blocks 55 on the shaft 44, as shown in Fig. 1. Vibrating movement is imparted to the shafts 53 and 54 by means of cams 56 on the shaft 3, these cams acting upon arms 57 on the shafts 53 and 54 through the medium of any suitable connection—as, for instance, a lever 100—held in engagement with the cam by a spring 101 and connected to the arm 57 by a rod 102, as shown in Fig. 14.

The double fabric produced in the loom passes between upper and lower bearing-plates 60, extending across the loom from side to side, and the threads crossing from the upper to the lower fabric are severed by a rotating cutter 61, which is traversed across the loom from side to side by mechanism hereinafter described, the fabrics, after being severed, passing to take-up rolls 62 and 63, one for the upper fabric and the other for the lower fabric, these take-up rolls being geared together by spur-wheels 64 and 65, Fig. 4, and the shaft of the lower roll having a worm-wheel 66, which meshes with a worm 67 on an inclined shaft 68, having at its lower end a worm-wheel 69, driven by a worm 70 on the shaft 3, Fig. 4. The rotary cutter 61 is carried by a block 71, which is guided upon a dovetailed or undercut bar 72, mounted upon the side frames of the loom and extending completely across the same in advance of the take-up rolls. To the slide 71 are connected the ends of a belt or band 73, which passes round suitable guide-pulleys 74 on the frame of the loom and round a driving-drum 75 on a shaft 76, which is adapted to bearings in standards or brackets at the side of the loom. On this shaft 76 is a spur-wheel 77, with which engages a rack 78, projecting internally from a yoke 79 on a rod 80, said yoke having a rib or flange 81, which is guided in a box 82, hung to the shaft 76, whereby the rack 78 is always maintained in engagement with the spur-wheel 77 irrespective of any swinging movement of the yoke. As the rod 80 is reciprocated, therefore, movement first in one direction and then in the opposite direction is imparted to the spur-wheel 77, shaft 76, and drum 75, and thence through the medium of the belt 73 to the slide 71, carrying the cutter 61, the rotation of the latter as it is reciprocated being effected in any of the usual ways—as, for instance, by means of a band or cord secured at its opposite ends to the loom-frame and passing round a grooved hub or pulley 61× on the spindle of the cutter. (See Fig. 5ª.)

The passage of the cutter back and forth across the loom should be effected in the intervals between the beating up of the weft-threads by the reed, the cutter remaining at one side or the other of the fabric during the time that the beating up of the weft-threads is actually taking place. In order to provide for this intermittent operation of the cutter, and also to lock the same at the opposite extremes of its movement, the rod 80 is connected to the pin of a crank 84 by a short shaft 85, which is adapted to bearings in brackets on the frame of the loom and carries a segmental gear-wheel 86, which has two toothed portions for engaging with the teeth of a wheel 87 on the crank-shaft 2 of the loom and intervening concave portions 88, which are engaged by a convex portion 89 of the wheel 87, so as to effect the locking of the wheel 86 in position in the intervals between the engagement of the toothed portions of the two wheels.

In looms of this class it is advisable to weave at each end of a length of pile fabric tabs or portions of plain fabric, and in order that this may be done we provide for giving a differential throw to the figure-lift boards, so that when it is desired to weave a tab each figure-lift board will have its throw so reduced that it will not carry the warps controlled by it from one shed to the other, but will simply raise and lower said warps in their own shed. For this purpose it is only necessary to provide for lost motion in the operating-rod 19 when the movement of the figure-lift boards is to be restricted. Hence we make said rod in two parts, as shown in Figs. 7, 10, 11, and 12, and secure to the lower part a block 90, in which the upper part of the rod is guided and under certain circumstances is free to play to an extent limited by the travel of a transverse bar or pin 91 in a slot 92 in the block, the movement of the figure-lift boards being hence reduced to an extent equivalent to this lost motion. In said block 90, however, is another slot 93 at right angles to the slot 92, and when a filling-piece 94 is inserted in this slot it locks the upper section of the rod 19 in its uppermost position, as shown in Fig. 10, and thus prevents any movement of one portion of the rod 19 independently of the other portion, the block 90 becoming, in fact, a rigid portion of said rod, so that the full throw of the same is imparted to the figure-lift boards.

For convenience of manipulation the filler 94 is hung by side arms 95 to the block 90, and on swinging outward is prevented from entirely leaving the slot 93 by means of a check-chain 96, while when said filler is pushed inward it is locked in position by a spring-pressed bolt 97, guided in an opening in the top of the block 90 and adapted to engage with a notch in the upper edge of the filler 94, as shown in Fig. 10.

The filler 94 and arms 95 may be so weighted that they will automatically swing outward on the withdrawal of the spring-bolt, or will swing so far outward as to be pushed fully outward by the rod 19, slots in the ends of the arms 95 permitting the swinging outward of the filler 94. (See Fig. 11.) A set-screw might, however, be used for locking the two sections of the rod apart, as shown, for instance, by dotted lines in Fig. 10, in which case the filling-piece would be unnecessary; but said filling-piece is preferred, because it can be so readily manipulated.

Having thus described our invention, we claim and desire to secure by Letters Patent—

1. The combination, in Jacquard mechanism for looms, of a lifter-board, a lazy-tongs structure for operating the same, and means for actuating said lazy-tongs structure, one of the upper arms of the said structure at each side of the lifter-board being connected to the same, whereby in its vertical movement the lifter-board partakes also of the swinging movement of the arm and is caused to assume reverse angles to accord with the angle of the top and bottom threads of the shed formed by the warps, substantially as specified.

2. The combination of the two figure-lift boards, a rock-shaft having arms connected to one of said boards, and a lazy-tongs structure connecting the other board to other arms on said rock-shaft, substantially as specified.

3. The combination of the vertically-guided lift-board with a lazy-tongs structure, the rock-shaft, and swinging arms on said shaft carrying said lazy-tongs structure, the upper ends of the latter being connected to the board and its lower ends to the arms of the rock-shaft, substantially as specified.

4. The combination, in a loom for weaving double pile fabrics, of the lathe with its upper and lower shuttle-boxes, the picker-stick, the rock-shaft having an arm connected to said picking-stick, a picking arm or hammer, a picking-block on the rock-shaft having long and short projections for the action of said picking-hammer, and means for reciprocating the rock-shaft so as to bring either its long and short projection under the action of the hammer, substantially as specified.

5. The combination, in a cutting device for double pile fabrics, of a knife-slide, a belt or band connected thereto, a drum to which said belt or band is also connected, a pinion on the shaft of said drum, a rack for reciprocating said pinion, and a frame serving as a guide for said rack and hung to the shaft of the pinion, substantially as specified.

6. The combination, in a cutting apparatus for double pile fabrics, of a knife or cutter slide, a belt or band connected thereto, a driving-drum for said belt or band, a rack-and-pinion mechanism for operating said drum, and means for reciprocating the rack, comprising a crank, a segment spur-wheel with intervening locking-concaves, and a driving-wheel partly toothed for engagement with said segments and partly convex for engaging with the locking-concaves, substantially as specified.

7. The combination, in a loom for weaving pile fabrics, of a figure-lift board and operating mechanism therefor having as elements a cam for giving a full throw to the board, a connecting-rod made in two parts, one movable in respect to the other to an extent equal to the difference between the maximum throw and the minimum throw of the board, and a filling-piece for preventing lost motion of one part of the rod in respect to the other, substantially as specified.

8. The combination, in a loom for weaving pile fabrics, of the figure-lift board and operating mechanism therefor having as elements a cam for giving a full throw to the board, a connecting-rod made in two parts, one movable in respect to the other to an extent equal to the difference between the maximum throw and the minimum throw of the board, a block carried by one of said parts of the rod and serving as a guide and stop for the other part, and means for locking the two parts of the rod in their separated positions, substantially as specified.

9. The combination of the lift-board rod, made in two parts, the slotted block, the filling-piece, the pivoted arms carrying the same, the locking-bolt, and the check-chain, substantially as specified.

In testimony whereof we have signed our names to this specification in the presence of two subscribing witnesses.

TOM I. SHUTTLEWORTH.
CHARLES H. BURT.
JOHN BURT.

Witnesses to signatures of Tom I. Shuttleworth and Charles H. Burt:
E. C. SAWYER,
H. S. HOWE.

Witnesses to signature of John Burt:
HENRY HOWSON,
WILLIAM D. CONNER.